Aug. 5, 1924.

A. N. SLACK 1,504,152

LAWN SPRINKLER

Filed Nov. 11, 1922    3 Sheets-Sheet 1

Inventor
A. N. Slack.

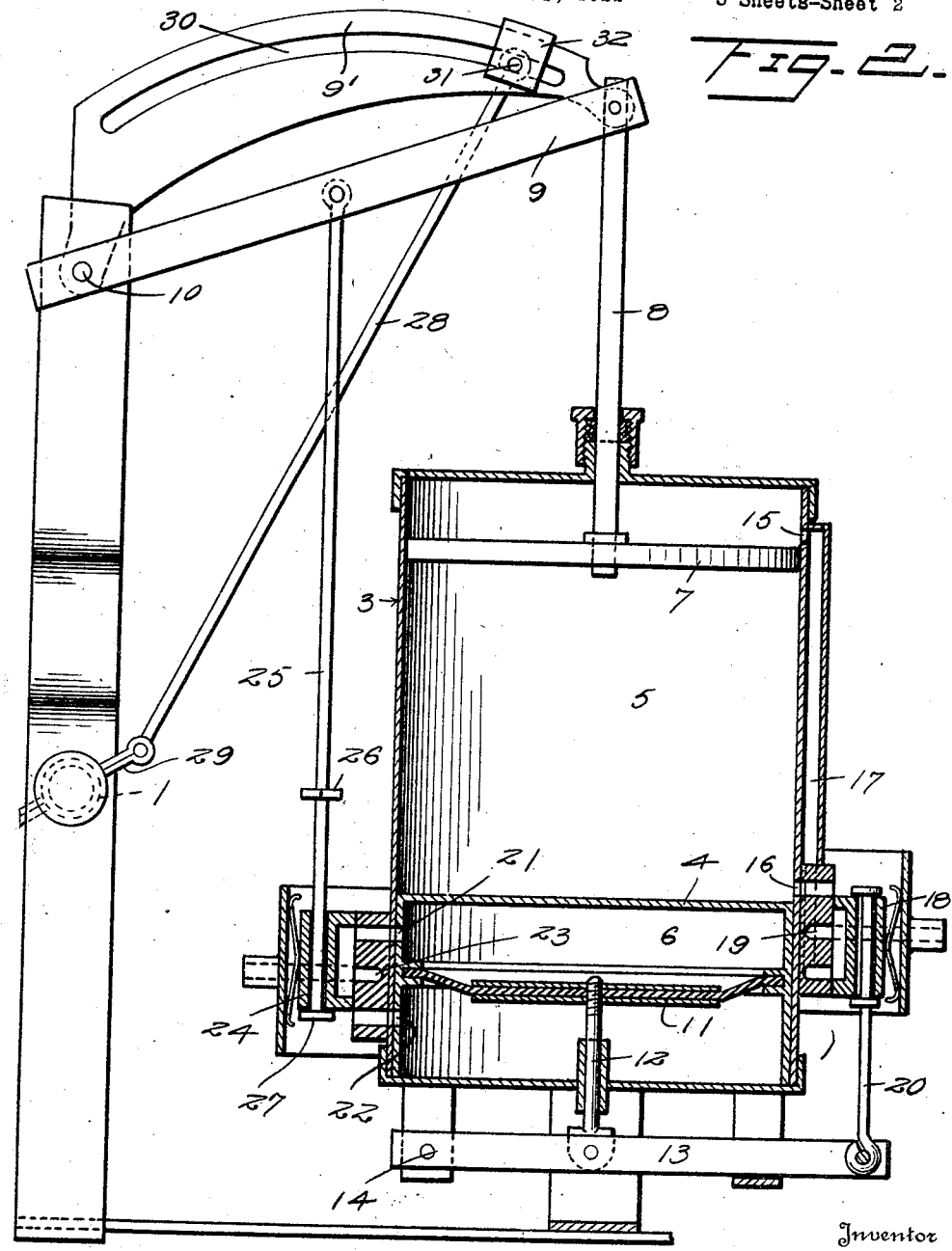

Aug. 5, 1924.
A. N. SLACK
1,504,152
LAWN SPRINKLER
Filed Nov. 11, 1922
3 Sheets-Sheet 3
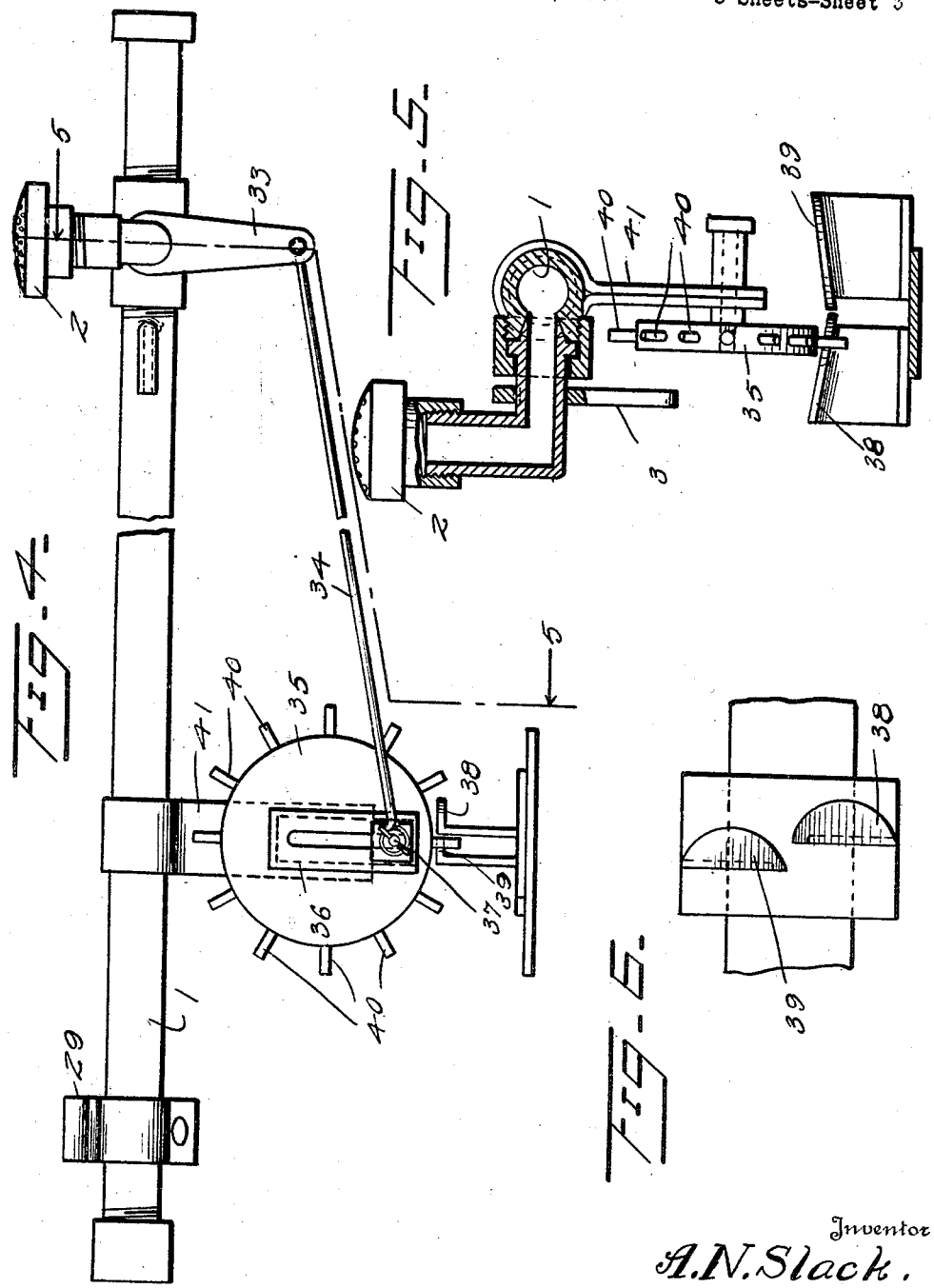
Inventor
A.N.Slack.
By
Attorney Patented Aug. 5, 1924.

1,504,152

UNITED STATES PATENT OFFICE.

ALBERT N. SLACK, OF BAKERSFIELD, CALIFORNIA.

LAWN SPRINKLER.

Application filed November 11, 1922. Serial No. 600,374.

*To all whom it may concern:*

Be it known that I, ALBERT N. SLACK, a citizen of the United States, residing at Bakersfield, in the county of Kern and State of California, have invented certain new and useful Improvements in Lawn Sprinklers; and I do hereby declare the following to be a full, clear, and exact description of the invention, such as will enable others skilled in the art to which it appertains to make and use the same.

The invention has relation generally to irrigating mechanism and specifically to means for watering lawns and its primary object is the provision of a mechanism which is automatic in operation in sprinkling a lawn for a determinate area both longitudinally and laterally, said mechanism being adjustable to independently vary the length and breadth of the area to be sprinkled.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 2 is a diagrammatical section, Figure 4 is a detail view of the spray pipe and means for oscillating the spray nozzle, Figure 5 is a sectional detail on the line 5—5 of Figure 4, looking to the left as indicated by the arrow.

Figure 6 is a diagrammatic plan view of the means for intermittently rotating the spur wheel by means of which the nozzle is oscillated.

Corresponding and like parts are referred to in the following description and designated in the several views of the drawings by like reference characters.

Figure 1:
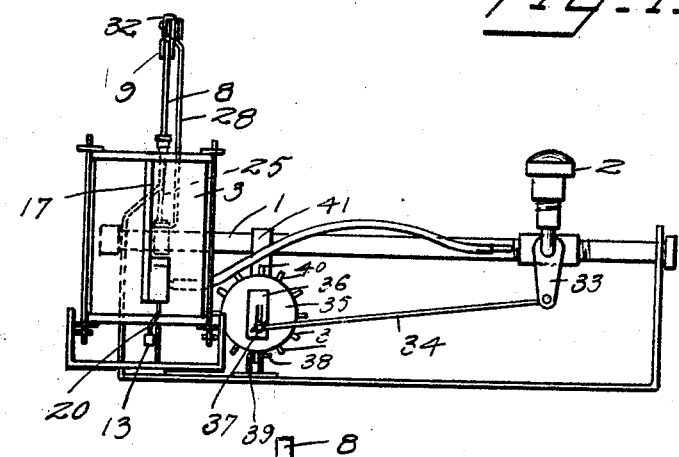
Figure 1 is a detail view in elevation of a lawn sprinkler embodying the invention.
Figure 3:
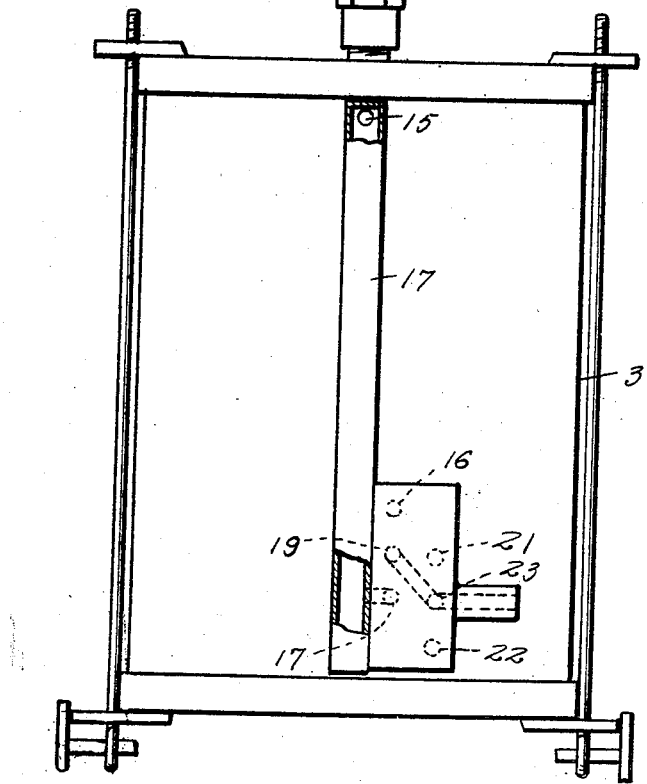
Figure 3 is an elevation of the cylinder and valve mechanism partly in section.

The mechanism comprises a pipe 1 provided with a spray nozzle 2, the pipe 1 being mounted to oscillate or rock and the nozzle 2 being mounted on the pipe 1 to move therewith and oscillate independently thereof. The oscillatory movement of the pipe 1 vibrates the nozzle 2 laterally, the amplitude of oscillation determining the breadth of the lawn to be sprinkled. The oscillatory movement of the nozzle 2 determines the length of the area of lawn to be sprinkled. These oscillatory movements are adjustable whereby provision is had for varying the length and breadth of the area of lawn to be sprinkled. Water from a suitable source of supply is supplied to the pipe 1 and it is essential that such water be supplied under pressure whereby to throw the same some distance after leaving the nozzle, as well as to operate the mechanism whereby the supply pipe and spray nozzle are controlled in their movement.

The mechanism includes a cylinder 3 which is divided by means of a partition 4 into an upper chamber 5 and a lower chamber 6. A piston 7 is disposed in the chamber 5 and its rod 8 operates through the upper head of the cylinder and is connected with an arm 9 pivoted to a suitable support at 10. A diaphragm 11 is located in the chamber 6 and a stem 12 fastened thereto at a central point operates through the lower end of the cylinder and is connected to a lever 13 pivoted at 14 to the cylinder. Ports 15 and 16 are provided at the upper and lower ends respectively of the chamber 5. A passage 17 is in communication with the port 15 and terminates a short distance from the port 16 and is adapted to be controlled by means of a slide valve 18 which is hollow and coacts with an inlet port 19 disposed intermediate the port 16 and the adjacent end of the passage 17. A rod 20 connects the valve 18 with the outer end of the lever 13 and as the latter is actuated, the valve 18 is moved to alternately connect the inlet port 19 with the port 16 and passage 17 and to uncover said port 16 and passage 17, whereby water is alternately supplied to opposite ends of the chamber 5 to effect a positive movement of the piston 7 therein, whereby to operate the pivoted arm 9.

Ports 21 and 22 communicate with upper and lower portions of the chamber 6 upon opposite sides of the diaphragm 11. An inlet 23 is adapted to be alternately connected with the ports 21 and 22 by means of a slide valve 24 similar in construction and operation to the valve 18. Movement of the diaphragm 11 effects a corresponding movement of the lever 13 which is connected thereto by means of the element 12, whereby to operate the valve 18 and control the supply of water to the chamber 5 to effect a reciprocating of the piston 7 therein. A rod 25 connected to the arm 9 loosely engages the valve 24 and is provided with spaced stop collars 26 and 27 which alternately engage the valve 24 and effect a movement thereof. The arrangement is such that the valve 24 is operated as the piston 7 reaches the limit of its stroke in each direction.

A link 28 adjustably connects the pivoted arm 9' with an arm 29 projecting laterally from the supply pipe 1 and movable therewith. The arm 9' is provided with a curved slot 30 which receives a bolt 31 which serves to clamp a slide 32 to the arm 9' and to which the upper end of the link 28 is pivoted. As the piston 7 moves up and down in the cylinder 3, the arm 9' is vibrated and effects a rocking or oscillation of the supply pipe 1, whereby the nozzle 2 is moved laterally from one side to the other. At the same time, the valve 24 is actuated to control the supply of water to the chamber 6 whereby the diaphragm 11 is moved up and down whereby to operate the valve 18 which controls the supply of water to the chamber 5 in the manner herein stated.

An arm 33 projects from the nozzle 2 and a link 34 adjustably connects it with a spur wheel 35, the latter having a slotted member 36 at one side which receives a bolt 37 to which the link 34 is pivoted and which is adjustable in the slot of the member 36 and adapted to be made fast in the required adjusted position. Cams 38 and 39 are disposed in the path of the spurs 40 of the spur wheel 35, whereby to effect an intermittent rotation of the spur wheel whereby to oscillate the nozzle 2. The cams 38 and 39 are disposed upon opposite sides of the frame of the spur wheel 35 when the latter is in vertical position and coact with the spurs 40 to impart an intermittent rotary movement to the spur wheel. A hanger 41 is fast to the pipe 1 and constitutes a mount for the spur wheel 35. It will thus be understood that as the pipe 1 oscillates or rocks, the spur wheel 35 mounted thereon receives a corresponding oscillatory movement, whereby the spurs 40 are caused to ride upon the cams 38 and 39 which are so disposed as to advance the spur wheel at each oscillation thereof.

From the foregoing taken in connection with the accompanying drawings it will be understood that the invention provides a mechanism whereby a predetermined area of lawn may be sprinkled both as to length and breadth and the mechanism is adjustable to vary the area of lawn to be sprinkled by adjusting the links 28 and 34 in the manner stated.

What is claimed is:

1. In a lawn sprinkler, a water-pipe, means for imparting an oscillatory movement to the water pipe, a nozzle mounted upon the water pipe, means for imparting an oscillatory movement to the nozzle in a plane at right angles to the oscillation of the pipe whereby to distribute the water over the length and breadth of a given area, means for varying the amplitude of oscillation of the pipe, and other means for varying the amplitude of oscillation of the nozzle, whereby to adapt the device to a variable area to be sprinkled.

2. In a lawn sprinkler, a water pipe having a lateral outlet, means for imparting an oscillatory movement to the water pipe, a nozzle pivotally mounted upon said pipe, a spur wheel mounted upon the water pipe, connecting means between said spur wheel and nozzle for vibrating the latter in a plane at right angles to the oscillatory movement of said pipe, and cooperating cams disposed in the path of the spurs of the spur wheel to effect an intermittent rotary movement of the latter simultaneously with its oscillatory movement.

3. A lawn sprinkler comprising a water pipe, a nozzle pivotally mounted upon the water pipe, a pivoted arm, means adjustably connecting the pivoted arm with the water pipe to admit of imparting a variable oscillatory movement to the latter, a spur wheel mounted upon the water pipe, means adjustably connecting the spur wheel with the nozzle to impart a variable oscillatory movement to the latter, cams adapted to cooperate with the spurs of said spur wheel to impart an intermittent rotary movement thereto, and a water motor having connection with said aforesaid pivoted arm.

4. In a lawn sprinkler, a water pipe having a lateral outlet, means for imparting an oscillatory movement to the water pipe, a nozzle pivotally mounted upon said pipe, a spur wheel mounted upon the water pipe, a means for forming a connection between the said spur wheel and nozzle for vibrating the latter in a plane at right angles to the oscillatory movement of said pipe, means for varying the eccentricity of the connection between said link and the spur wheel to vary the oscillatory movement imparted to the nozzle, and cooperating cams disposed in the path of the spurs of the spur wheel to effect intermitent rotary movement of the latter simultaneously with the oscillatory movement of the water pipe.

In testimony whereof I affix my signature in presence of two witnesses.

ALBERT N. SLACK.

Witnesses:
D. E. CAINE,
C. W. NEWBERY.